United States Patent Office 2,724,475
Patented Nov. 22, 1955

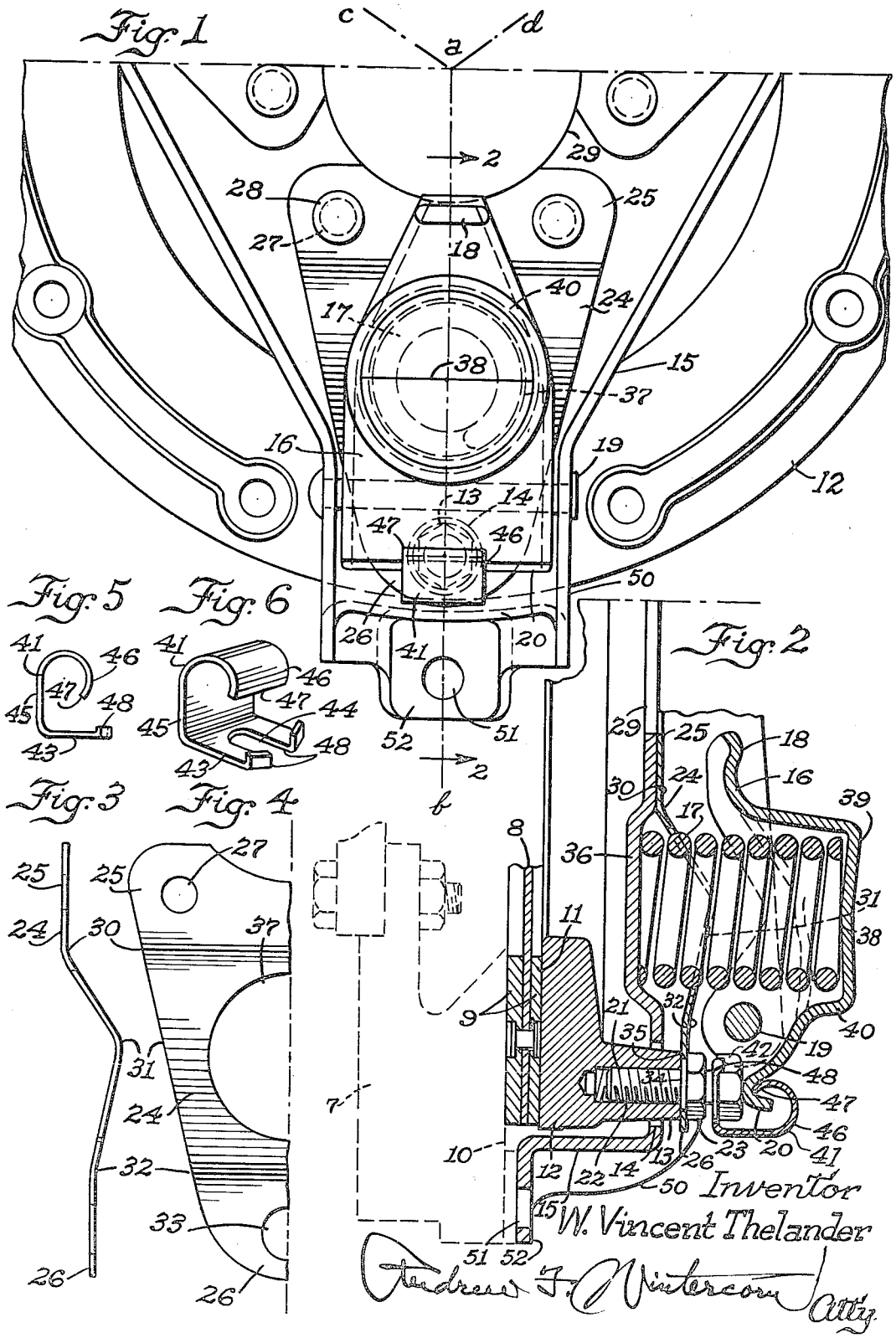

2,724,475
FRICTION CLUTCH

W. Vincent Thelander, Toledo, Ohio, assignor to Dana Corporation, Toledo, Ohio, a corporation of Virginia Application August 29, 1951, Serial No. 244,174

11 Claims. (Cl. 192—99)

This invention relates to friction clutches for use on automobiles, tractors, and other vehicles, and suitable also for industrial applications.

In clutches like that disclosed in my Patent 2,214,780, issued September 17, 1940, the pressure plate is moved toward engaged position by novel spring-pressed release levers and is moved toward disengaged position by spring means acting between the back plate and drive lugs on the pressure plate. However, these lugs projecting through openings in the back plate with a predetermined operating clearance caused an objectionable rattle unless special provisions were made to eliminate the hammer noise. An example of such special provisions is disclosed in Patent 2,515,277, issued to E. M. DeCoursey and me on July 18, 1950.

In my copending application, Serial No. 656,327, filed March 22, 1946, which resulted in Patent 2,589,308, issued March 18, 1952, I disclosed a construction which was a simpler and more economical solution to the problem. In that construction leaf springs are provided between the radially inner portion of the back plate and the back of the pressure plate to serve the triple purpose of returning the pressure plate to retracted position upon release of the clutch, assuming drive torque when the clutch is engaged, and centering the pressure plate so that the lugs on the pressure plate which heretofore caused the objectionable rattle in contact with the sides of the openings in the back plate are kept more or less centralized with respect to said openings, thereby eliminating rattling. That design, however, imposed too many functions on the leaf springs for continuously satisfactory operation, and it is, therefore, the principal object of my invention to provide novel spring means resiliently connecting the drive lugs on the pressure plate with the ends of the release levers to retract the pressure plate in the disengagement of the clutch, thereby relieving the leaf springs of that difficult function, and greatly improving the operation of the clutch generally. In other words, the leaf springs in the present clutch transmit drive from the back plate to the pressure plate, and keep the latter centered relative to the back plate, but the release levers move the pressure plate in and out more or less positively by virtue of the connections afforded by hook-shaped spring clips applied to the headed ends of the adjusting screws carried on the drive lugs on the pressure plate and hooked onto the outer ends of the release levers.

The above and other objects and advantages of the invention will appear in the following specification, in which reference is made to the accompanying drawing, wherein—

Fig. 1 is a rear view of a clutch embodying my invention, only one of three release levers being shown in combination with its associated leaf spring for centering and transmitting drive to the pressure plate, and the return spring connecting the release lever and pressure plate;

Fig. 2 is a section on line 2—2 of Fig. 1;

Figs. 3 and 4 are two views of the leaf spring by itself, and

Figs. 5 and 6 are, respectively, a side and a perspective view of the return spring.

The same reference numerals are applied to corresponding parts in these views.

Referring to Figs. 1 and 2, the reference numeral 7 is applied to a flywheel mounted on the rear end of the usual engine crank shaft and forming the driving element. 8 designates a clutch disc having the usual facings 9 for engagement with the flat back face 10 on the flywheel and the flat front face 11 on the pressure plate 12, the disk 8 being mounted in the usual way by means of a hub portion splined on the front end of a shaft constituting the driven element and extending rearwardly from the clutch into the gear box of the transmission in the usual way. The clutch illustrated is like that disclosed in my Patent 2,214,780, mentioned above, but it should be understood that the present invention is not limited to that particular clutch but may be used on any friction clutch where a similar problem of providing anti-rattle means is presented; that is to say, in any friction clutch wherein the pressure plate has rearward projections or drive lugs like that indicated at 13, projecting through openings like that indicated at 14, in a back plate like that indicated at 15, or in back plate segments, bearing in mind that in an earlier Thelander et al. Patent 1,985,301, issued December 25, 1934, the conventional back plate was eliminated in one form, and a number of separate brackets fastened to the flywheel were substituted, each bracket forming what was called a lever support. In accordance with the two patents mentioned, a plurality of release levers 16 are provided which are arranged to be depressed against the action of compression springs 17 by clutch pedal operation of a throw-out bearing (not shown) against the inner ends 18 of the levers to disengage the clutch. These levers are pivoted on cross-pins 19 near their outer ends 20 to transmit pressure of the springs 17 in a multiplied degree to the pressure plate 12, and, although the pressure of the springs 17 is multiplied through the levers 16 for clutch engagement, it is apparent that there is an appreciable mechanical advantage in the disengagement of the clutch by reason of the fact that the springs 17 are closer to the pivots 19 than the inner ends 18 of the levers where the throw-out bearing engages, thus making for lighter pedal action. This arrangement is also of advantage from the standpoint that there is very little loss of spring pressure when the clutch facings 9 become worn, because so little expansion of the springs is permitted for a given amount of wear of the facings. The lugs 13 have adjusting screws 21 threaded in longitudinal holes 22 provided therein, and, when the heads of the screws 21 are properly adjusted relative to the outer ends 20 of the levers 16, lock nuts 23 on the shanks of the screws 21 are tightened to lock the screws in adjusted position. In taking up for wear on the facings 9, the screws 21 are backed up a turn or so after the lock nuts 23 have been loosened, and when the correct relationship of the clutch parts has been restored in that way, the screws 21 are locked again in adjusted position by tightening the nuts 23.

The lugs 13, which are cast integral with the plate 12, are of circular cross-section and are left rough on the diameter, instead of being milled off flat on opposite sides, as on all present pressure plates, the holes 14 through which the lugs 13 project being also circular and large enough in diameter in relation to the lugs 13 to provide ample clearance, inasmuch as the drive is assumed by the leaf springs 24, of which there are as many per clutch as there are release levers 16, one associated with each of said levers. This design avoids the necessity also for accurate finishing and dimensioning of the holes 14. The leaf springs 24, which assume the drive, are generally triangular in form and are disposed substantially radially with respect to the back plate with the base portion 25 innermost and the apex portion 26 outermost. The end 26 of each spring is parallel but offset in relation to the end 25 to afford yield lengthwise of the leaf spring, as required for the axial movement of the plate 12 relative to back plate 15. The base portion 25 has holes 27 provided therein at the opposite ends to receive rivets 28 by means of which the leaf spring is rigidly secured to the outer side of the back plate next to the central opening 29 through which the driven shaft extends. The leaf spring 24 is bent outwardly with respect to the base portion 25 on a transverse line 30 in an arc to define a humped intermediate portion 31. The outer or apex portion 26 is flat, the transverse line 32 defining the juncture of the bulged intermediate portion 31 and the end portion 26. A center hole 33 is provided in the end portion 26 that is larger in diameter than the threaded shank portion of the screw 21 and receives with a close working fit the reduced cylindrical portion 34 on the bottom of the lock nut 23 whereby the outer end portion 26 of the triangular drive spring 24 serves to center the pressure plate 12 with respect to the back plate 15, and, at the same time center the lugs 13 in the holes 14. The opposite end portions 25 and 26 are substantially parallel to one another, as clearly appears in Figs. 2 and 3, but the humped intermediate portion 31 projects out of the planes of the two end portions, and that fact, coupled up with the fact that the leaf spring 24 is tapered toward the outer end 26, accounts for a certain desired degree of flexibility of the outer end 26 relative to the inner end 25 in a plane parallel to the planes of the pressure plate 12 and back wall of the back plate 15. The leaf springs 24, therefore, afford a resilient driving connection between the back plate 15 and pressure plate 12 but are much more easily flexed in a plane at right angles to the driving plane, as required for the axial movement of the pressure plate to and from engaged position. In other words, in the present clutch the leaf springs 24 have only two functions, which they are well adapted to perform, namely, transmitting drive from the flywheel 7 and back plate 15 to the pressure plate 12, and maintaining the pressure plate 12 in concentric relation to the back plate and flywheel with the drive lugs 13 centered in the holes 14 so that there will be no rattle or hammer noise due to vibratory contact between the drive lugs 13 and the back plate 15 in the holes 14. The step diameter 34 on the bottom of each lock nut 23 is a few thousandths of an inch short in relation to the thickness of the leaf springs 24 so that there is nothing to interfere with tightening the lock nuts properly to maintain whatever adjustment is made on the screws 21, and at the same time insure tight clamping of the outer end portions 26 of the leaf springs on the machined flat outer ends 35 of the lugs 13. The milling of the flat surfaces 35 represents the only machining required in the lugs 13 with the present construction. Consequently, the present construction can be produced at an appreciable saving in cost over the prior designs.

The back plate 15 has circular depressions 36 provided therein in which the inner ends of the springs 17 are seated, the springs projecting through large center holes 37 provided in the humped intermediate portions 31 of the leaf springs 24, and bearing at their outer ends against transverse fulcrums 38 formed diametrically of the circular end walls 39 of the embossed portions 40 formed from the web portions of the stamped channel-shaped sheet metal release levers 16. The springs 17 normally hold the clutch engaged under heavy spring pressure, the distance from fulcrum 38 to pivot 19 being greater than the distance from the outer end portion 20 to the pivot 19, so that the spring pressure is multiplied. However, inasmuch as the distance from the pivot 19 to the fulcrum 38 is less than the distance from the pivot 19 to the inner end portion 18 of the release lever, it is possible to release the clutch with light pedal pressure. The release lever 16, in addition to applying the engaging pressure, in accordance with my invention, have the additional function of retracting the pressure plate in the disengagement of the clutch, in order to relieve the leaf springs 24 of that difficult function, and accordingly greatly improve the operation of the clutch generally. Spring clips 41 are provided to connect the heads 42 of the screws 21 with the hook-shaped outer ends 20 of the release lever 16, each spring clip being generally L-shaped, the one leg 43 of the L being the attaching portion and having a slot 44 to receive the shank portion of the associated screw 21, while the other leg 45 extends outwardly parallel to the screw and has a hook-shaped end portion 46, the extremity 47 of which has line fulcrum contact in the hollow of the hook-shaped outer end portion 20 of the associated release lever 16, as clearly appears in Fig. 2. Lugs 48 on the inner extremity of the attaching portion 43 on opposite sides of the slot 44 are angularly related like the facets of the hexagonal head 42 on the screw 24 engaged by the spring clip 41 and bear against two neighboring facets so that the spring clip is held against displacement under centrifugal force and held against turning relative to the screw head after the spring clip is placed in assembled relation to the screw and release lever. With this construction it will also be evident that the clips 41 may be removed readily when the screws 21 are to be adjusted, and that the clips may as readily be applied again, and that the clips are disposed substantially in the same relationship to the associated screw and release lever in all positions of adjustment of the screw and also in all positions that the release lever assumes with respect to the screw head in the operation of the clutch. The spring clips apply enough spring tension between the outer ends of the release levers and the heads of the screws to insure more or less positive return of the pressure plate when the clutch is disengaged.

In operation, assuming that there are three leaf springs 24 in a 120° circumferentially spaced relationship, as indicated by the center lines *ab, ac* and *ad* in Fig. 1, the leaf springs 24 serve primarily to transmit spring cushioned drive from the back plate 15 to the plate 12, and they maintain the pressure plate in centered relation to the back plate with the lugs 13 centered approximately in the holes 14 so the rattling or hammering previously caused by contact at those points is prevented and smoother and quieter operation all around is secured. The leaf springs 24, in other words, are made to serve only the two functions for which they are best adapted. Positive return of the pressure plate 12 upon disengagement of the clutch is obtained by means of the spring clips 41, these spring clips, as pointed out above, being designed to permit quick and easy removal and replacement when the screws 21 have to be adjusted to compensate for wear of the facings 9 in the clutch plate 8. In the event of breakage of any one or more of the leaf springs 24 the clutch is still operable because under such conditions the lug or lugs 13 associated with the broken spring or springs will then transmit drive directly to the back plate in the holes 14. The construction is also advantageous in the shipment of the clutch assembly because the leaf springs 24 serve as stops to limit upward movement of the pressure plate 12 away from the back plate 15 under the action of the springs 17 by contact with the back plate, as should be clear from a study of Fig. 2. The clutch is also well ventilated, due to the fact that the pressure plate 12 is exposed throughout the major portion of its circumference between the radially extending channel-shaped spoke portions 50 that are attached to the flywheel by screws entered in the holes 51 provided in the attaching pad portions 52.

In the foregoing description I have assigned to the release levers 16 the function of positively retracting the pressure plate 12 upon disengagement of the clutch. However, it should be understood that this is only in the nature of an "assist" for the leaf springs 24 to more or less relieve them of that duty and insure positive return of the pressure plate. The leaf springs 24, in other words, are preferably the same, or substantially the same, as the ones disclosed in my earlier co-pending application, the same having at their outer ends a force component in a rearward direction so as to help move the pressure plate to retracted position. That is, they still serve to urge the pressure plate normally to retracted position, and, in so doing they lighten the amount of pedal pressure necessary in the disengagement of the clutch.

It is believed the foregoing description conveys a good understanding of the objects and advantages of my invention. The appended claims have been drawn to cover all legitimate modifications and adaptations.

I claim:

1. In a clutch comprising, in combination, a flywheel, a back plate carried thereby, a driven member, an axially movable pressure plate having a plurality of rearwardly extending drive projections in circumferentially spaced relation received with lateral clearance in registering openings provided therefor in said back plate, spring means to transmit engaging pressure to said pressure plate, elongated release levers radially disposed relative to said pressure plate and pivoted intermediate their ends relative to the back plate and adapted to be operated manually at their inner ends for disengagement of the clutch and to transmit engaging pressure to the pressure plate drive projections at their outer end, said spring means working through the instrumentality of said levers, a plurality of flexible elongated leaf springs each having a longitudinally curved portion intermediate the ends thereof, said springs being affixed at one end to said pressure plate in circumferentially spaced relation and extending radially inwardly and affixed at the inner end to said back plate so as to support the pressure plate in centered relationship to the back plate with the drive projections on the pressure plate substantially centered in the openings in the back plate, said leaf springs being flexible relatively easily lengthwise to permit axial movement of said pressure plate for engagement and disengagement of the clutch but being flexible much less easily edgewise, whereby they are adapted to transmit driving torque from the back plate to the pressure plate, and resilient means adjustable relative to said pressure plate drive projections slidably pivotally connecting the outer ends of said levers with said pressure plate drive projections for push and pull operation of the pressure plate.

2. In a clutch comprising, in combination, a flywheel, a back plate carried thereby, a driven member, an axially movable pressure plate having a plurality of rearwardly extending drive projections in circumferentially spaced relation received with lateral clearance in registering openings provided therefor in said back plate, spring means to transmit engaging pressure to said pressure plate, elongated release levers radially disposed relative to said pressure plate and pivoted intermediate their ends relative to the back plate and adapted to be operated manually at their inner end for disengagement of the clutch and to transmit engaging pressure to the pressure plate drive projections at their outer end, said spring means working through the instrumentality of said levers, adjustable clearance takeup screws threaded in and having headed ends projecting rearwardly from the drive projections and operatively engaged by the outer ends of said release levers which transmit the engaging pressure of said spring means thereto, said screws having lock nuts thereon, a plurality of flexible elongated leaf springs each having a longitudinally curved portion intermediate the ends thereof, said springs being affixed by means of said screws and lock nuts to the rear end of said pressure plate drive projections and extending substantially radially inwardly and affixed at their inner end to said back plate to support the pressure plate in centered relationship to the back plate with the drive projections on the pressure plate substantially centered in the openings in the back plate, said leaf springs being flexible relatively easily lengthwise to permit axial movement of said pressure plate for engagement and disengagement of the clutch but being flexible much less easily edgewise, whereby they are adapted to transmit driving torque from the back plate to the pressure plate, and resilient means adjustable relative to said pressure plate drive projections slidably pivotally connecting the outer ends of said levers with said pressure plate drive projections for push and pull operation of the pressure plate.

3. A clutch as set forth in claim 2, wherein each of said lock nuts has a reduced cylindrical concentric projecting neck portion on its inner side which fits closely in a circular opening provided in the outer end of the associated leaf spring, whereby more accurately to locate the drive projection of the pressure plate by means of the leaf spring.

4. A clutch as set forth in claim 2, wherein each of said lock nuts has a reduced cylindrical concentric projecting neck portion on its inner side which fits closely in a circular opening provided in the outer end of the associated leaf spring, whereby more accurately to locate the drive projection of the pressure plate by means of the leaf spring, the neck portion being of shorter length than the thickness of the leaf spring, whereby to permit tighter fastening of the lock nut to hold the adjusting screw securely in adjusted position, and also permit clamping the outer end portion of the leaf spring by means of the nut.

5. In a clutch, a return spring for connecting the end of a clutch release lever with the headed end of an adjusting screw on a clutch pressure plate to cause the return movement of the pressure plate to retracted position with the lever when the lever is operated to disengage the clutch, said return spring being formed from an elongated spring of flat spring material bent approximately to L-shape, one leg of the L being for attachment to the headed end of the screw and having a slot provided therein extending inwardly from the end adapted to receive the shank of the screw, the same leg having lugs bent from the outer end on opposite sides of the slot in spaced relationship to one another for locating abutment with the side of the screw head, the other leg of the L terminating in a hooked portion projecting from the same side of the leg as the first named leg of the L for operative abutment with the back of the release lever.

6. In a clutch, a return spring for connecting the end of a clutch release lever with the headed end of an adjusting screw on a clutch pressure plate to cause the return movement of the pressure plate to retracted position with the lever when the lever is operated to disengage the clutch, said return spring being formed from an elongated strip of flat spring material bent approximately to L-shape, one leg of the L being for attachment to the headed end of the screw and having an opening provided therein to receive the shank portion of the screw, the other leg of the L terminating in a hooked portion projecting from the same side of the leg as the first named leg of the L for operative abutment with the back of the release lever.

7. In a clutch comprising, in combination, a flywheel, a back plate carried thereby, a driven member, an axially movable pressure plate having a plurality of rearwardly extending drive projections in circumferentially spaced relation received with some lateral clearance in registering openings provided therefor in said back plate, spring means to transmit drive engaging pressure to said pressure plate, a plurality of flexible elongated leaf springs each having a longitudinally curved portion intermediate the ends thereof, each of said springs having a circular opening provided in one end through which a screw threaded in the rear end of the associated drive projection is entered to connect the spring to the pressure plate, said springs extending radially inwardly and being affixed at their inner ends to said back plate to support the pressure plate in centered relationship to the back plate with the drive projections on the pressure plate substantially centered in the openings in the back plate, a lock nut on each of said screws having a reduced cylindrical concentric projecting neck portion fitting closely in the circular opening provided in the associated leaf spring, whereby more accurately to locate the drive projection of the pressure plate by means of the leaf spring while permitting clamping the outer end portion of the leaf spring by means of the nut and locking the screw in adjusted condition, said leaf springs being flexible relatively easily lengthwise to permit axial movement of said pressure plate but being flexible much less easily edgewise, whereby they are adapted to support the pressure plate so that the drive projections are substantially centered in the openings in the back plate when the pressure plate is not transmitting torque, said leaf springs resisting lateral displacement of said drive projections from centered position when the pressure plate transmits torque, until said drive projections engage one side of said openings and afford positive drive, thereby positively limiting flexure of said leaf springs, and release levers for causing disengagement of the clutch operatively associated with the aforesaid screws.

8. In a clutch, the combination of a pressure plate and a clutch actuating lever adapted to transmit push and pull movement to the pressure plate in the engagement and disengagement of the clutch, respectively, an adjusting screw on the pressure plate having a headed end in abutment with said lever, and a spring member connecting the headed end of said screw with the abutting end of said lever, said spring member being formed from an elongated strip of flat spring material bent approximately to L-shape, one leg of the L being for attachment to the headed end of the screw and having a slot provided therein extending inwardly from the end adapted to receive the shank of the screw, the same leg having lugs bent from the outer end on opposite sides of the slot in spaced relationship to one another for locating abutment with the side of the screw head, the other leg of the L terminating in a hooked portion projecting from the same side of the leg as the first named leg of the L for operative abutment with the back of the lever.

9. In a clutch, the combination of a pressure plate, a back plate, and a clutch actuating lever pivoted intermediate its ends on the back plate and adapted to transmit push and pull movement at one end to the pressure plate in the engagement and disengagement of the clutch, respectively, an adjusting screw on the pressure plate having a headed end in abutment with the pressure plate actuating end of said lever, and a spring member connecting the headed end of said screw with the abutting end of said lever, said spring member being formed from an elongated strip of flat spring material bent approximately to L-shape, one leg of the L being for attachment to the headed end of the screw and having an opening provided therein to receive the shank portion of the screw, the other leg of the L terminating in a hooked portion projecting from the same side of the leg as the first named leg of the L for operative abutment with the lever on the opposite side from that engaged by the headed end of the screw.

10. In a clutch, the combination of a pressure plate and a clutch actuating lever adapted to transmit push and pull movement to the pressure plate in the engagement and disengagement of the clutch, respectively, an adjusting screw on the pressure plate having a headed end in abutment with said lever, and a spring member connecting the headed end of said screw with the abutting end of said lever, said spring member being formed from an elongated strip of flat spring material bent approximately to L-shape, one leg of the L being for attachment to the headed end of the screw and having an opening provided therein to receive the shank portion of the screw, the same leg having lugs bent from the outer end on opposite sides of the opening in spaced relationship to one another for locating abutment with the side of the screw head, the other leg of the L terminating in a hooked portion projecting from the same side of the leg as the first named leg of the L for operative abutment with the back of the lever.

11. In a clutch, a return spring for connecting the end of a clutch release lever with the headed end of an adjusting screw on a clutch pressure plate to cause the return movement of the pressure plate to retracted position with the lever when the lever is operated to disengage the clutch, said return spring being formed from an elongated strip of flat spring material bent approximately to L-shape, one leg of the L being for attachment to the headed end of the screw and having an opening provided therein to receive the shank portion of the screw, the same leg having lugs bent from the outer end on opposite sides of the opening in spaced relationship to one another for locating abutment with the side of the screw head, the other leg of the L terminating in a hooked portion projecting from the same side of the leg as the first named leg of the L for operative abutment with the back of the release lever.

References Cited in the file of this patent

UNITED STATES PATENTS

| 1,587,089 | Thompson | June 1, 1926 |
| 2,171,908 | Beringer | Sept. 5, 1939 |
| 2,256,708 | Geyer et al. | Sept. 23, 1941 |
| 2,277,221 | Gamble | Mar. 24, 1942 |
| 2,385,517 | Hunt | Sept. 25, 1945 |
| 2,485,214 | Peterson et al. | Oct. 18, 1949 |
| 2,589,308 | Thelander | Mar. 18, 1952 |